(No Model.)
J. GIVEN.
ATTACHMENT FOR LAWN MOWERS.
No. 355,074. Patented Dec. 28, 1886.
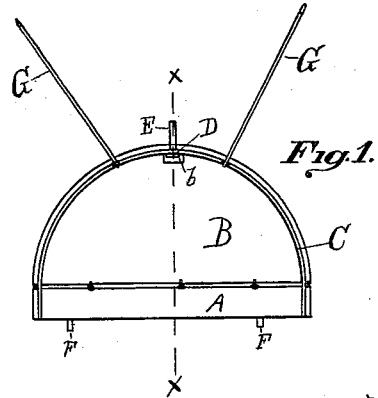
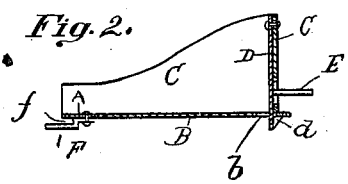
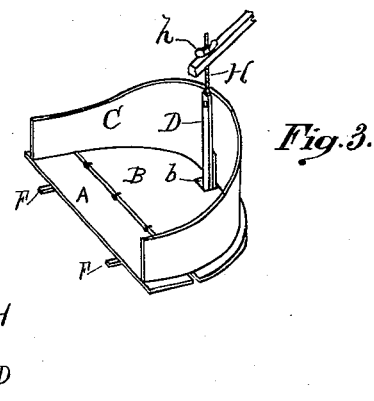
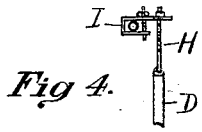
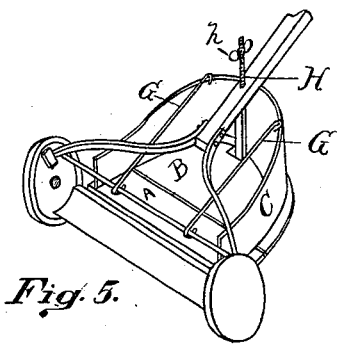
Attest
E. M. Harmon
O. M. Hill
Inventor
John Given
per Wm. Hubbell Fisher
Atty.

UNITED STATES PATENT OFFICE.

JOHN GIVEN, OF MOUNT LOOKOUT, OHIO.

ATTACHMENT FOR LAWN-MOWERS.

SPECIFICATION forming part of Letters Patent No. 355,074, dated December 28, 1886.

Application filed June 3, 1886. Serial No. 203,978. (No model.)

*To all whom it may concern:*

Be it known that I, JOHN GIVEN, of Mount Lookout, Hamilton county, and State of Ohio, have invented certain new and useful Improvements in Attachments for Lawn-Mowers, of which the following is a specification.

The object of my invention is to provide a device for attachment to a lawn-mower, which shall hold the grass cut by the mower and deposit it in a heap at any desired point.

In the accompanying drawings, forming part of this specification, Figure 1 is a top view of my attachment. Fig. 2 is a section taken through the line X X, Fig. 1. Fig. 3 is a perspective view of the attachment. Fig. 4 shows a modification of the device for attaching the attachment to the handle. Fig. 5 is a perspective view of a mower provided with my attachment.

The attachment is essentially a scoop-like receptacle provided with a drop-bottom. The bottom consists of two parts, A and B, the latter hinged to the former. A guard, C, forms the outside of the receptacle, and is itself rigidly attached to the piece A. A spring, D, Fig. 2, is bolted to the inside of the guard C, and projects downward through the opening $b$ in the bottom B. The lower end of the spring D is provided with a projection forming the hook $d$, which catches under the bottom B and holds it up. A stud, E, projects backward from the spring D, through a suitable opening in the guard C. A pair of hooks, F, are attached to the under surface of the piece A in such a manner as to leave a space, $f$, between the hook and the piece A. When the attachment is in position, the tail-piece of the mower fits in the space $f$, and in this way the attachment is held in place.

To hold the attachment more firmly in position, I usually provide it with the two rods G. These rods G are hinged to the guard C, and are provided with hooked ends, which catch over a rod on the mower. The attachment may also be provided with the rod H, which projects vertically upward from the guard C, and passes through an opening in the handle of the mower. The thumb-nut $h$ is screwed down on the rod H to the handle of the mower. When the rod H is made of iron or any similar material, an offset, I, clamped to the handle may be provided, through which the rod H passes and is secured by a thumb-nut, as before described.

When in use, the grass cut by the mower passes backward into the attachment. When a sufficient quantity has been collected, or the receptacle is full, the stud E is pressed forward by the foot. This releases the bottom B, which drops, and the grass is deposited in a heap. The bottom is then lifted up and is caught and held by the hook $d$.

By slight and unimportant modifications the device may be attached to any lawn-mower. By its use the labor of raking the grass into heaps preparatory to removal is entirely dispensed with.

What I claim as new and of my invention, and desire to secure by Letters Patent, is—

1. The combination of the bottom A B, provided with opening $b$, guard C, spring D, provided with hooked extremity $d$, stud E, and means for holding the attachment in place, substantially as and for the purposes set forth.

2. The combination of the bottom A B, provided with the opening $b$, guard C, spring D, provided with hooked extremity $d$, stud E, hooks F, and hooked rods G, substantially as and for the purposes set forth.

JOHN GIVEN.

Attest:
O. M. HILL,
M. M. SMITH.